Dec. 19, 1939.                    W. E. URSCHEL                    2,183,631
                APPARATUS FOR SEPARATING BEETS FROM BEET LEAVES
                       Filed Oct. 30, 1935          3 Sheets-Sheet 1
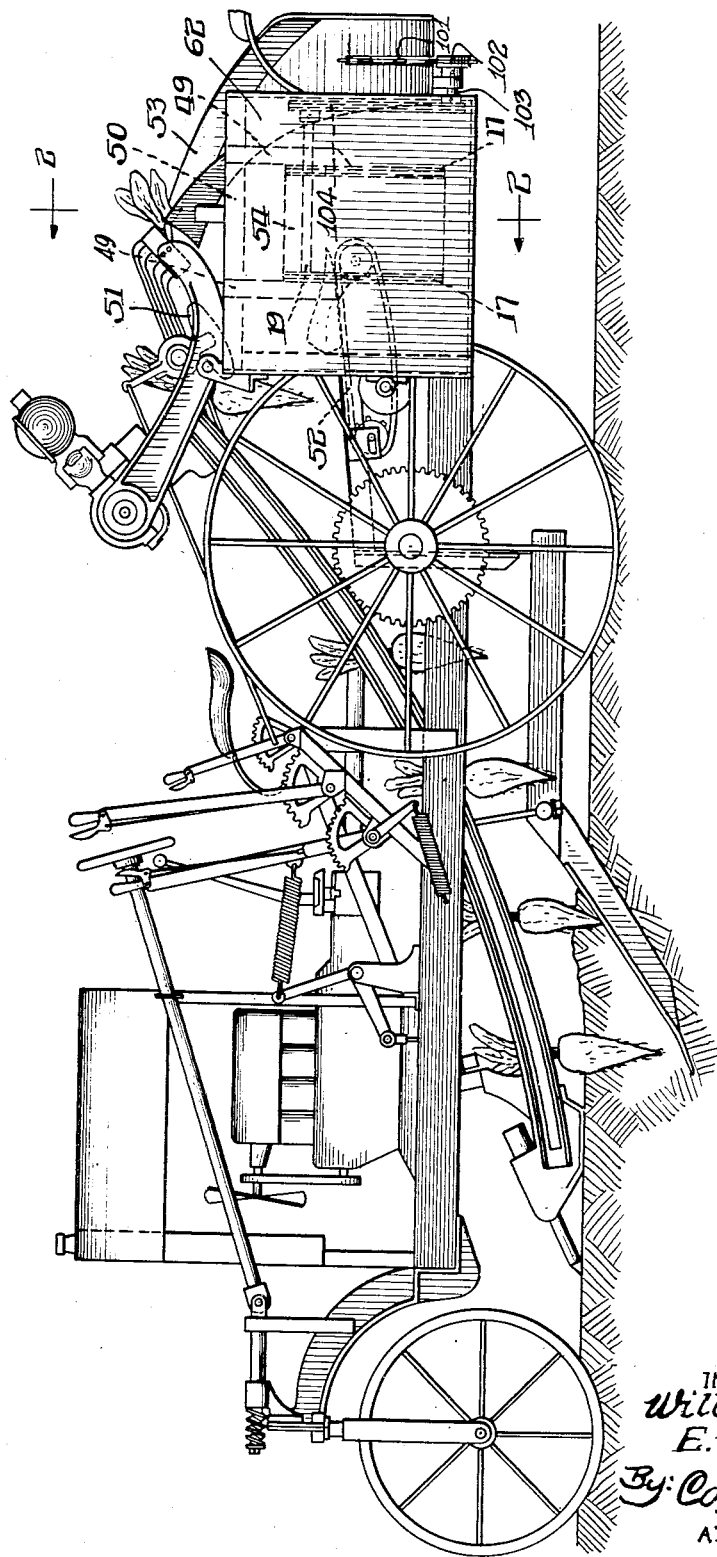
INVENTOR.
William
E. Urschel
By: Cox & Moore
ATTORNEYS.

Dec. 19, 1939. W. E. URSCHEL 2,183,631
APPARATUS FOR SEPARATING BEETS FROM BEET LEAVES
Filed Oct. 30, 1935 3 Sheets-Sheet 2
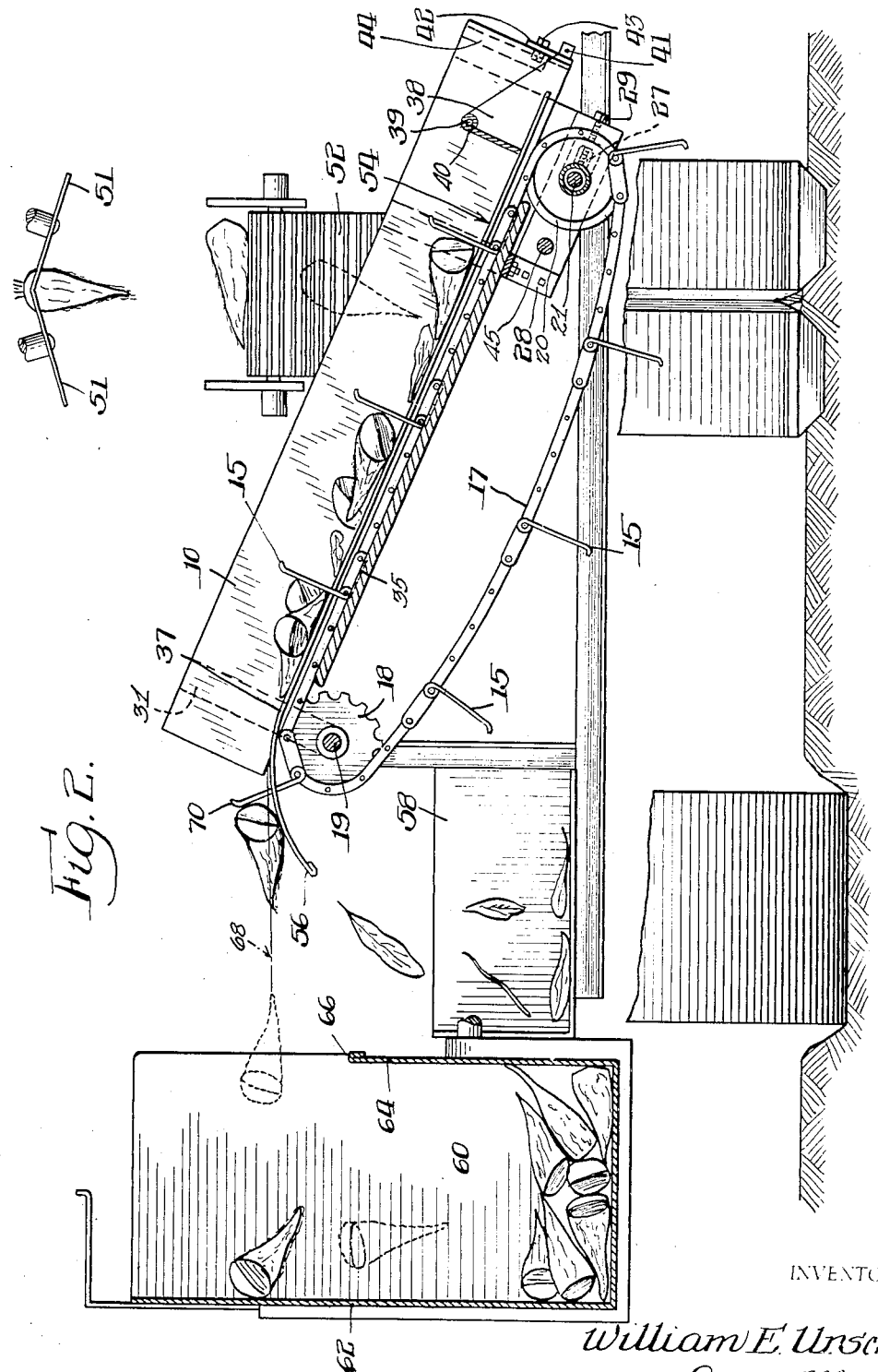
INVENTOR.
William E. Urschel
By: Cox & Moore
ATTORNEYS.

Dec. 19, 1939.  W. E. URSCHEL  2,183,631
APPARATUS FOR SEPARATING BEETS FROM BEET LEAVES
Filed Oct. 30, 1935  3 Sheets-Sheet 3
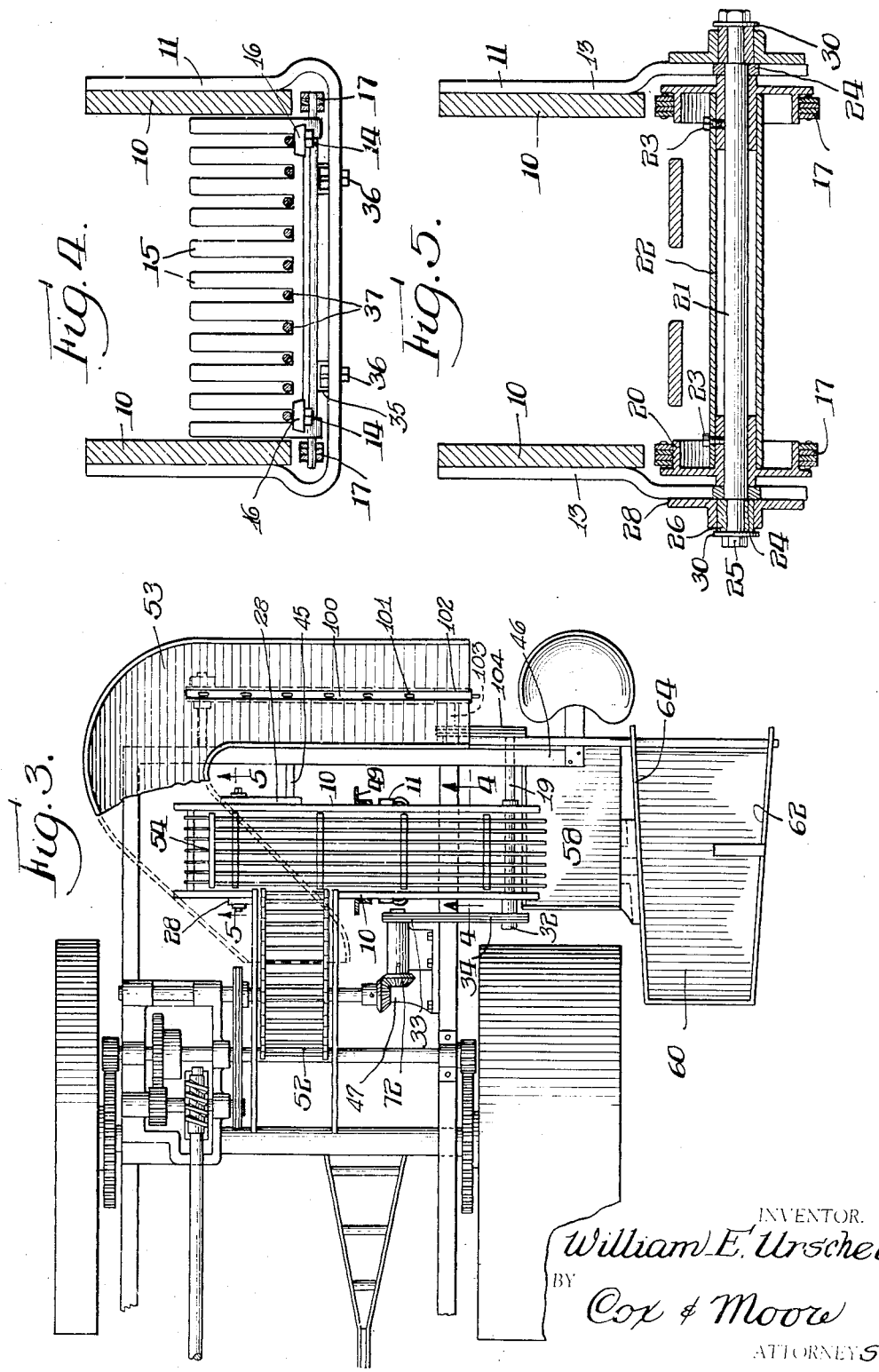
INVENTOR.
William E. Urschel
BY
Cox & Moore
ATTORNEYS.

Patented Dec. 19, 1939

2,183,631

UNITED STATES PATENT OFFICE 2,183,631

APPARATUS FOR SEPARATING BEETS FROM BEET LEAVES

William E. Urschel, Valparaiso, Ind.

Application October 30, 1935, Serial No. 47,365

2 Claims. (Cl. 209—120)

This invention relates to apparatus for the harvesting of beets and similar vegetables or fruits.

One of the objects of my invention is to provide an apparatus for the economical, speedy, and efficient separation of beets and the like from their leaves and after the leaves have been cut from the beets.

Another object of my invention is to provide an apparatus for the harvesting of beets whereby the beets are collected in a manner to render them substantially free of leaves and/or accumulated dirt.

These and other objects of the invention will appear from the perusal of the following specification taken in connection with the accompanying drawings wherein:

Figure 1 is a side elevation of a sugar beet harvesting machine which includes as a part thereof a simple embodiment of my means for separating a mixture of loose beets and their loose leaves;

Figure 2 is a cross-sectional view on line 2—2 of Figure 1;

Figure 3 is a plan view of a portion of the apparatus shown in Figure 1;

Figure 4 is a section on line 4—4 of Figure 3; and

Figure 5 is a section on line 5—5 of Figure 3.

While I have shown my invention as applied to sugar beet harvesting apparatus, which is adapted to remove the beets from the soil, to transport the beets with their detached leaves past a beet topping device and partially separate the leaves from the severed beets preliminary to the final separating step forming the subject matter of my invention, however, the invention may likewise be embodied in a device wholly divorced from the preliminary harvesting mechanism above described.

It is also to be understood that insofar as certain aspects of the application are concerned, it is applicable to the treatment of other vegetables or fruits for the separation of a loose mass of accumulated leaves from such vegetables or fruits.

The essential feature of the invention resides in the separation of the topped beets and the like from an objectionable proportion of free leaves whereby the harvested beets substantially divorced from all of their leaves are discharged at a desired point.

For the purpose of exemplifying the invention as applied to the sugar beet harvesting device and by reference particularly to Figures 1 and 3, it will be seen that the beets transported past a rotating topping knife 51 fall in topped condition to a conveyor 52. From this conveyor they are transported to a cross-conveyor 54, which latter conveyor is intimately associated with my present invention.

The major proportion of the leaves which are topped from the beets fall into a conveyor 53 which is shown in Figure 3 as inclined downwardly at the rear.

Conveyor 54 consists of longitudinal side members 10, preferably two in number, held by transverse members 11 bolted or otherwise secured to the side members. Bolts 14, Figure 4, secure slats or beet projecting fingers 15 to detachable chain attachment 16 spaced at regular intervals along chains 17. These chains 17 are driven by sprockets 18 pinned to a shaft 19 and idle upon the wheel 20 rotatably mounted upon shaft 21. The wheels 20 are held in spaced relation to tube 22, fastened to the hubs of wheels 20 by cap screws 23, and shoulders are preferably formed at both ends of shaft 21 at the points 24. Nuts 25 in threaded relation with the end of shaft 21 hold members 26 against the shoulders of shaft 21 at points 24 with enough pressure to prevent shaft 21 from revolving in the circular apertures in the members 26.

Members 26 are shiftably mounted in slots 27, Figure 2, formed of casting 28 bolted to supporting members 13. Members 13 are in turn bolted or otherwise secured to the side members 10. Elongated cap screws 29 are rotatably mounted in casting 28 to engage with threaded apertures in members 26 whereby to provide means for adjusting said members in slots 27 to provide a take-up to maintain the tension on chains 17. Transverse movement of the shaft 21 is prevented by washers 30 mounted at each end of said shaft. The shaft 19 is rotatably mounted in the bearings formed in the casting 31, bolted or otherwise secured to the side members 10. The drive shaft 32 is keyed to the extended portion of shaft 19 and is driven by a sprocket 33 through chain 34 provided with a means for operating the conveyor. The lower edges of the projecting means herein shown as upstanding slats or fingers 15 on the upper flight of chain 17 are kept in the same plane by two longitudinal channel members 35 fastened to the transverse frame members by bolts 36.

A plurality of longitudinal rods 37 disposed between the upstanding fingers 15 on the upper run of the chains 17 are held in fixed relation by the spacing of said fingers 15. Welded or otherwise fastened to one end of longitudinal rods 37 are triangularly shaped members 38 which are held against longitudinal movement by a bolt 39 secured to side frames 10. Members 38 are held in fixed relation by tubular spacers 40 and prevented from rotating about the bolt 39 by pins or any suitable means such as a wire going through holes 41 in the extended portion of said members which are projected through the slots in plate 42. Bolts 43 at each end of plate 42 secure said plate to angle irons 44 bolted at the side members 10. A rod 45 is secured in any conventional manner to transverse frame members 46 and 47 passes through circular apertures formed in casting 28 thus supporting the lower end of the conveyor and additional support therefor is provided by angles 49 secured to side members 10 and bolted to the longitudinal frame member 50.

It will be noted that the conveyor 54 extends upwardly as shown clearly in Figure 2 and that at its upper end the rods 37 bend downwardly in an arcuate curve. The projecting ends of the rods 37 may be bent to any desired adjustment downwardly away from the common plane of the conveyor 54, the adjustment of these fingers changing the speed of projection of the beets from the conveyor as hereinafter set forth up to a relatively small percentage of their speed, say for instance, ten percent of the speed can be so altered.

With like reference to Figure 2, it will be noted that at the rear of this conveyor 54 and under the arcuate ends 56 of the conveyor rods 37, there is provided a space or gap preferably occupied by a receptacle 58. It will likewise be noted that to the rear of this receptacle 58 and directly opposite and in the path of movement of beets discharged from the rear end of conveyor 54, I provide a receptacle 60 comprising a relatively high rear wall 62 and a front wall 64, the upper edge 66 of which is disposed a predetermined distance below the horizontal plane 68 of the highest point of the rods 37.

The speed of the conveyor drive sprockets, the pitch diameter of the conveyor drive sprockets, the speed and height of the conveyor fingers while travelling in a straight line up the conveyor 54 and also while travelling around the upper drive sprocket, the distance between the center of the conveyor drive sprocket and the high side of the dump end of the conveyor 54 and the distance between the center of conveyor drive sprocket and the low side of the dump end have very definite predetermined relation for effecting the separation of the beets and their leaves. For example, with a selected speed for the conveyor drive sprockets of the conveyor 54 of two hundred to five hundred revolutions per minute, the pitch diameter of the drive sprockets will be four and a half inches, and produce at the lower speed limit a lineal speed of travel of conveyor slats or fingers 15 while travelling in a straight line of 228 feet per minute, it will be apparent that due to the curved arrangement of the arcuate portion 56 of the rods 37 at the dump end of the conveyor and the relation of the fingers 15 which are approximately from 3½ to 3⅝ inches high, passing thereacross at such end, the speed of these conveyor fingers 15 at their ends while travelling around the sprocket will be approximately 592 feet per minute. With such an arrangement, I form the partition 64 so that the distance between a vertical plane passing through the center of the conveyor drive sprocket at the rear of the conveyor 54 and the vertical partition 64 is substantially 24 inches and that the distance between the horizontal plane 68, see Figure 2, and the top of this partition 64, is 6 inches. It will be seen that the curved ends 56 of the rods 37 curve in a rather general arc considerably below the horizontal plane 68 passing through the topmost point of the rods at the discharge end of the conveyor 54. By this arrangement I find that during the time the fingers 15 are moving to a position parallel to and beneath the plane of said rods, the pressure of the fingers pressing against the beets increases considerably due to the constant change in the distance of the point of their contact with the beets from the centers of the sprockets 18. Accordingly, as the point of contact of the beets with the fingers 15 nears the point 70 of fingers 15, it increases the speed with which the beets are forced along the rods 37 to such an extent that it will cause the beets to be projected from the ends of the rods 37 along a substantially horizontal trajectory to cause them to be thrown across the free intervening space between the partition 64 and the ends 56 of the fingers so that they will be thrown into the box 60 beyond partition 64.

By throwing the mass of beets and leaves through the air at an elevation in a substantially horizontal direction, I am enabled to take advantage of the air resistance to the relatively light leaves having a relatively large superficial area whereby the flight of the leaves is arrested substantially quickly and the leaves will fall into the box space 58 short of the partition 64 whereas the relatively heavier beets will be forced over and beyond the upper edge 66 of the partition 64 into the container 60. In the majority of instances the beets will be impacted with some violence against the rear partition 62 at which point any dirt attempting to cling to the beets will be shaken loose.

I have found that by selecting the speed of travel of the fingers 15 in the manner aforesaid and by arranging the curved ends of the rod 56 at an elevation and by spacing the ends of the rods from the partition 64 in the manner aforesaid, that when a mixture of loose beets and loose leaves with the proportion of loose leaves to the beets amounting to about five percent is passed by the conveyor upwardly as hereinbefore described, that when the fingers 15 throw the beets and leaves rearwardly, the beets will clear the upper edge of the partition 64 while the leaves will fall short of the partition 64 and will fall downwardly into the space occupied by the box 58. Thus, by projecting the combined free leaves and free beets along different trajectories and in the manner aforesaid, I am enabled to effect a clean, substantially complete, quick, and economical separation of the topped beets from their loose leaves.

Beets discharged from said conveyor from the dump box 60 may be emptied at regular intervals to form piles of beets upon a field, the leaves falling into the box 58 either falling freely to the ground or being dumped as desired.

It will be appreciated that the rods 37 extending beyond the sprockets 18 tend to clear the fingers 15 of beet roots or leaves or other form of material and prevent beets or material from being carried back of the chains 17 which might otherwise cause the conveyor to clog or choke.

It is understood that any selected arrangement or proportion may be used in elevating the upper end of the conveyor 54 or any proportion of finger 15 speed with respect to such elevation, with respect to the curvature of the rear end 56 of the rods 37, and with respect to the distance between the center of the rear sprocket 18 and the partition 64, and with respect to the elevation of the upper edge of the partition 64, and the plane 68 may be selected to accomplish separation of the leaves and beets hereinbefore described, as such proportions will vary with the speed of travel of the beets and the general weight and/or size of the beets. However, I have found that with the average beet the treatment hereinbefore given obtains the desired results.

It will be apparent that in some instances I may arrange the conveyor 54 to travel in a horizontal plane or in any type of inclination from horizontal to raised inclination provided the conveyor 54 and the fingers 15 are moved along at sufficient speed to accomplish the propelling of the beets and leaves through the air with sufficient force so as to cause the beets to pass beyond the zone of falling of the leaves. The conveyor 54 is made of sufficient length so that the beets which are discharged thereonto from the conveyor 52 will have sufficient time to settle down without bouncing and so that the fingers 15 can exercise the maximum conveying effect thereupon. In certain instances it is desirable to provide means for adjustably changing the speed of travel of the conveyor 54 with regard to its source of power. This can be accomplished either by substituting a different gear arrangement at the point 72, see Figure 3, or by inserting suitable change speed gear device, whereby with any desired speed of travel of the machine the speed of travel of the conveyor for the separation of the beets and the leaves may be secured.

In general, the percentage of the leaves and beets depend upon the weather, on the soil, and on the length of the beet and will vary from three to ten percent, that is, the leaf content of the mass of leaves and beets will vary from three to ten percent. This is generally due to inadequate severing of the leaves from the beets. In the final separation of the beets as they arrive into box 60, I find with my invention that the percentage of leaves to beets varies from zero to approximate one percent. In other words, the general maximum amount of leaves in the box 60 is substantially not more than one percent of the beets therein and this will vary down to a complete separation of the beets from the leaves.

By forming the conveyor 54 at its base with spaced apart rods, provision is made for the passage therethrough of any dirt which attempts to cling to the beets as they are dumped from the conveyor 52 onto the conveyor 54. The transfer of these beets from one conveyor to another tends to dislodge the dirt and this dirt may fall through the spaced apart rods as the beets are conveyed up the conveyor 54.

It will be understood that also by adjusting the length of the fingers 15 the speed of the beets as they are projected from the conveyor may be controlled.

With regard to the leaf conveyor 53, I prefer to provide the same with a substantially centrally located, longitudinally extending slot at its end in which operates a sprocket chain provided with a plurality of upstanding fingers which are adapted to push the leaves from the end of the conveyor 53. The sprocket chain may be driven by means of a shaft extending from the sprocket shaft 19 as clearly shown in Figure 3. It will be noted that the end of this chute is located substantially near the operator's seat. This seat is directly opposite the box 59 so that an operator sitting there can both dump the beet receiving receptacle 60 and can also remove any particular beets which might fall short of the partition 64 and put them into receptacle 60.

Means is provided for discharging the leaves from the leaf chute 53. This means comprises a conveyor chain 100 having a plurality of propelling fingers 101 projecting through a slot in the lower portion of the chute 53. The conveyor chain 100 is driven by a sprocket 102 mounted on a shaft 103, which latter shaft is driven by a cable 104 and suitable pulleys from the shaft 19.

This application is a continuation in part of application in the name of William E. Urschel, Serial Number 653,582, filed January 26, 1933, for Beet conveyor.

Having thus described my invention, what I claim as new and desire to secure by Letters Patent is:

1. In a beet harvesting machine, the combination of an upwardly inclined conveyor comprising a plurality of spaced apart, longitudinally extending supports forming the bottom of said conveyor, the supports at the end of said conveyor being bent arcuately downwardly, a plurality of spaced apart fingers adapted to travel along said supports and between the spaces occupied thereby, said fingers being of considerable height as they travel along said conveyor, means for discharging an intermingled mass of loose beets and loose leaves on to said conveyor, means for propelling the fingers along said conveyor, said fingers as they pass the arcuately downwardly curved supports being constructed and arranged to accelerate said beets and leaves with sufficient speed to project the beets and leaves outwardly from the end of said conveyor, and a receptacle disposed below the horizontal plane of the rear end of said conveyor a substantial distance whereby beets projected from said fingers will be discharged into said receptacle and whereby leaves will fall short of said receptacle.

2. In a beet harvesting machine, means for topping the beets, a chute adapted to receive the main body of leaves from the topped beets, a conveyor adapted to receive the topped beets and a relatively small percentage of free leaves, a second conveyor adapted to receive the discharge of said first conveyor, said second conveyor being inclined upwardly and comprising a plurality of propelling fingers adapted to engage behind the mass of beets and leaves as they are discharged onto said second conveyor and to propel said beets and leaves in a given direction through the air, a receptacle disposed below the level of the discharge end of said conveyor and at a sufficient distance therefrom to receive the beets so projected, the leaves falling short of said receptacle, means operated in synchronism with the movement of the vehicle for operating the beet topping means, means operated in synchronism with the movement of the vehicle for operating the second mentioned conveyor, a plurality of propelling fingers cooperating with said leaf chute for discharging the leaves therefrom and means operated from the second mentioned conveyor for operating the propelling fingers of the leaf chute.

WILLIAM E. URSCHEL.